Figure 1:
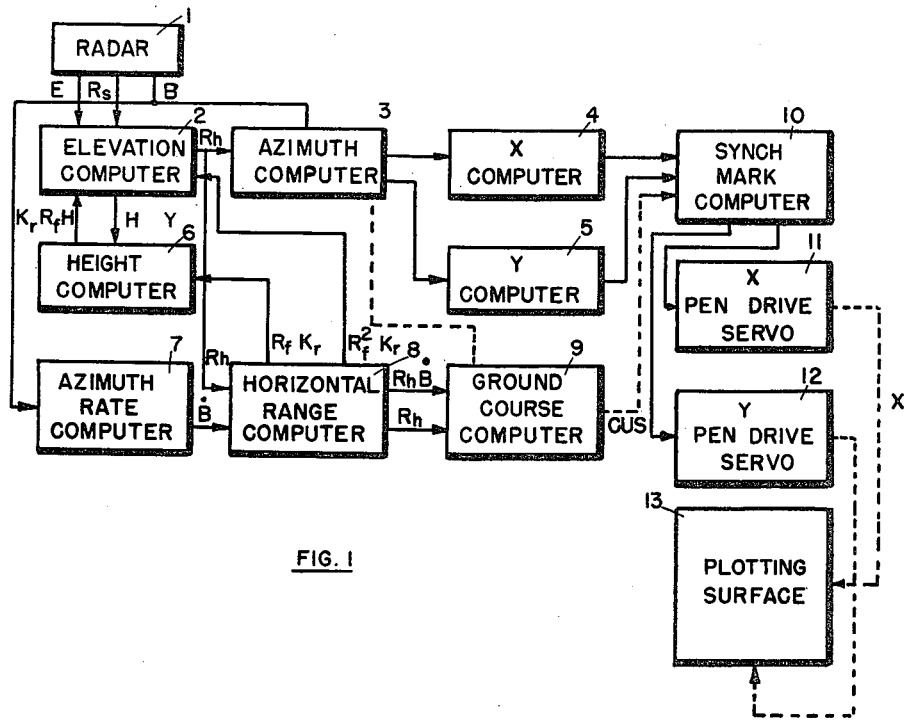

Jan. 22, 1963

E. F. LAPORTE 3,075,190

POSITION INDICATOR SYSTEM

Filed Dec. 27, 1956

2 Sheets-Sheet 1

INVENTOR.
EUGENE F. LAPORTE

BY *Lewis L. Humphries*

ATTORNEY

INVENTOR.
EUGENE F. LAPORTE 3,075,190
POSITION INDICATOR SYSTEM
Eugene F. Laporte, Eau Gallie, Fla., assignor to North American Aviation, Inc.
Filed Dec. 27, 1956, Ser. No. 631,003
7 Claims. (Cl. 343—10)

This invention relates to position indicators and more particularly to a control system which utilizes an angular motion repeating device and associate switching means to provide a direction indicating mark on a position indicating display device.

In systems providing guidance information to steer aircraft or missiles there is often required a plotting system which will give a visual indication of the ground location of the aircraft. In order to fulfill the functions of such a system and to insure accurate recording with regard to time, a circuit is desired which will cause a synchronizing mark to appear on the map trace plotting board of the system. Such a system must produce marks on the plotting board which will show the position and direction of the aircraft at all times.

In the past synchronizing mark systems provided a mark which was either along the X axis or Y axis of the plotting board. A disadvantage of such a system was encountered when the synchronizing mark and the map trace were along the same path. When this situation occurred, the synchronizing marks were often hidden. Another disadvantage occurred upon the coincidence of the incoming and outgoing trace when it was a practical impossibility to determine the direction of the aircraft's course.

This invention contemplates an analogue plotting system which is continuously indicating the ground course of a moving object on a display area and which places a mark on the display area which is an indication of the direction of travel of the moving object. The system will provide a mark which is at a predetermined angular relation with the ground course indication so that regardless of the direction of travel of the object, the mark will trace a path on the display area which indicates the direction of the course of the moving object.

It is therefore an object of this invention to provide a system for indicating the position and direction of a moving target in a predetermined plane.

It is another object of this invention to provide a position indicating system for generating a pair of position signals respectively indicative of a pair of rectangular coordinates of an object moving in a spatial course.

It is a further object of this invention to provide a plan position indicator system for indicating the position and direction of a movable object in a horizontal plane.

It is a still further object of this invention to provide a plan position indicating system for a moving target which will show the direction of the map trace at all times.

It is another object of this invention to provide an analogue plotting system having a display device for continuously indicating the position of a movable object in a predetermined plane.

It is still another object of this invention to provide a position indicator system for a moving target which produces a synchronizing mark on a display device which is at a predetermined angular displacement from a continuous indication of the position of the target.

It is a still further object of this invention to provide a plan position indicating system for aircraft for continuously indicating the position of an aircraft and producing a direction marking component of predetermined angular displacement from the indicated position of the aircraft.

Figure 3:
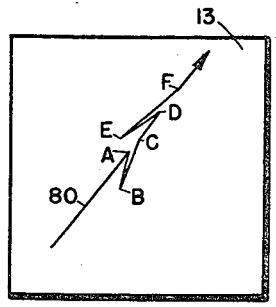
Figure 2:
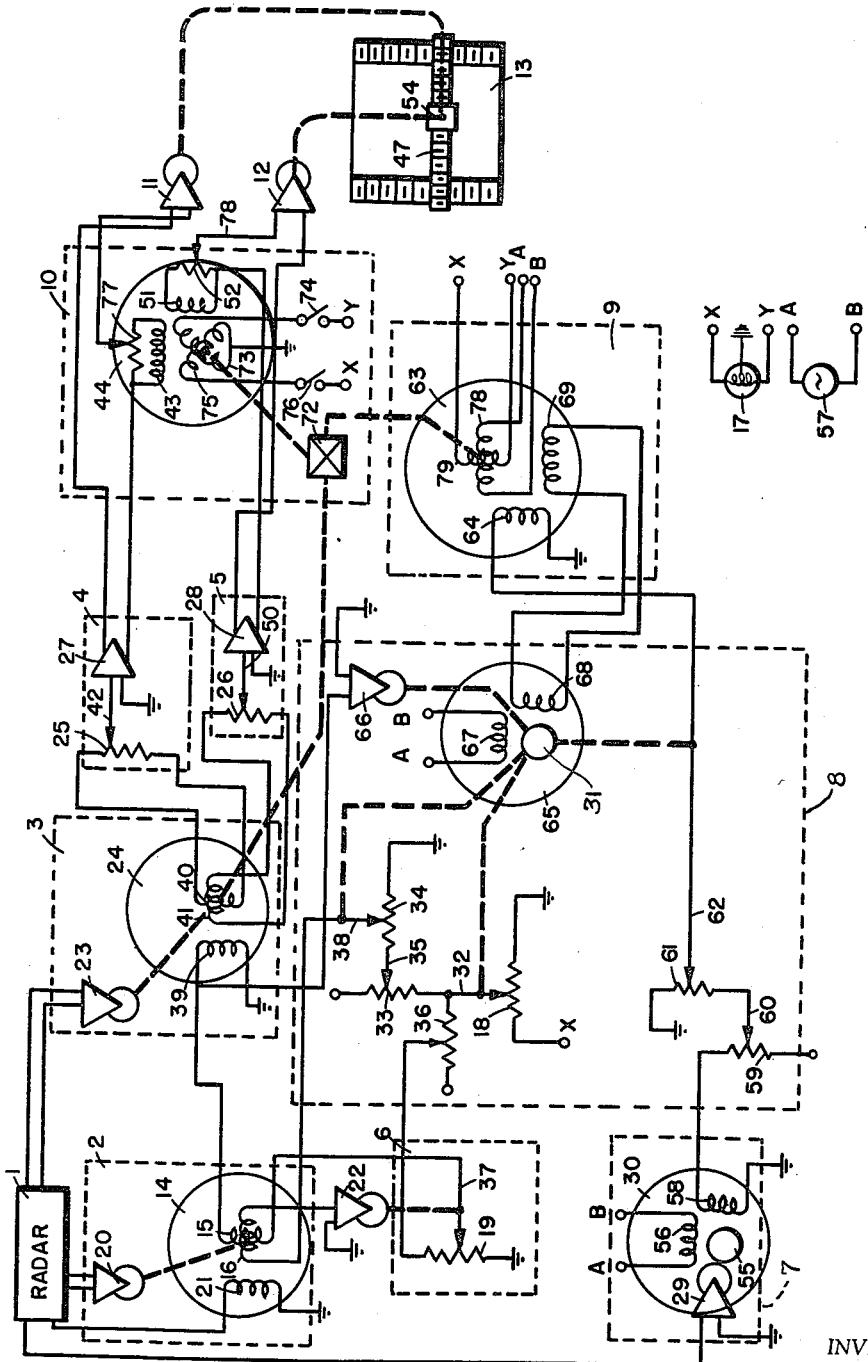

Other objects of invention will become apparent from the following description taken in connection with the accompanying drawings, in which FIG. 1 is a block diagram of the invention;
FIG. 2 is a schematic diagram of the invention;
And FIG. 3 shows a continuous ground course indication of a moving target with direction marking signals on a recording surface.

Before discussing the operation and function of the apparatus of this invention, a brief discussion of the basic principles utilized in the position indicator system to provide a continuous trace of the aircraft's position will be given.

The position of any object in space can be located in a horizontal plane by means of the X and Y coordinates of the object. In order to continuously plot the position of a moving target, such as an aircraft or guided missile, in a horizontal plane, the target position data are converted to X and Y coordinate data continuously. There are three computations involved in doing this. The first computation is to determine the uncorrected horizontal range and the height of the target above a horizontal reference plane which may be, for example, a radar reference plane. The uncorrected horizontal range is the distance between the radar and the projection of the target onto the radar reference plane. This is solved trigonometrically by combining slant range and elevation angle data received from the ground radar. The slant range is the straight line distance between the radar and the target. The uncorrected horizontal range is equal to the slant range times the cosine of the elevation angle. The height above the reference plane equals the slant range times the sine of the elevation angle. The second computation is to correct the uncorrected horizontal range and the height above the reference plane for the curvature of the earth and thereby to obtain a corrected horizontal range and height above the earth. The third and final computation is to determine the X and Y coordinates from the corrected horizontal range and the azimuth angle. The X coordinate plotted along the east-west axis of the plotting board is equal to the corrected horizontal range times the sine of the azimuth angle. The Y coordinate plotted along the north-south axis is equal to the corrected horizontal range times the cosine of the azimuth angle. In addition for versatility in other computation uses a ground course signal is required. The ground course signal is proportional to the angle the target makes with true north and on the plotting board is the angle between the map trace, representing a continuous indication of the target's spatial position in a horizontal plane, and the Y axis of the plotting board, which represents true north. Thus the ground course signal is equal to $B + AT$ where $B$ is the azimuth angle from the radar and $AT$ is the angle whose tangent is equal to the horizontal range times the azimuth rate divided by the horizontal range rate.

In FIG. 1, radar 1 continuously tracks a target such as an aircraft or missile and transmits to a display device such as the plotter 13, by means of the position indicator system to be described, present position data of the aircraft being tracked. The data furnished by radar 1 consists of the slant range indicated as $R_s$, the azimuth angle indicated as B and the elevation angle indicated as E. Radar 1 provides the slant range $R_s$ and the elevation angle E to elevation computer 2 and provides azimuth angle B to azimuth computer 3 and azimuth rate computer 7. Elevation computer 2 utilizes the slant range signal $R_s$ to produce a signal proportional to uncorrected horizontal range $R_u$ and a signal proportional to uncorrected height $H_u$. These signals are corrected for earth curvature and the corrected horizontal range $R_h$ is fed to azimuth computer 3 and the corrected height H is fed to height computer 4. Azimuth computer 3 combines the corrected horizontal range $R_h$ with the azimuth B received from radar 1. The outputs of azimuth computer 3 are the X and Y coordinates of the aircraft's position. The X coordinate is equal to the horizontal range times the sine of the azimuth angle ($R_h$ sin $B$) and the Y coordinate is equal to the horizontal range times the cosine of the azimuth angle ($R_h$ cos $B$). Azimuth computer 3 also supplies azimuth B to ground course computer 9. X computer 4 receives the east-west coordinate signal from azimuth computer 3 and converts it to a certain displacement magnitude determined by the map scale used on plotting surface 13. The output signal of X computer 4 is applied through synch mark computer 10 to X pen drive servo 11. Y computer 5 receives the north-south coordinate signal from azimuth computer 3 and converts it to a displacement magnitude also determined by the map scale used. The output signal from Y computer 5 is applied through synch mark computer 10 to Y Pen Drive servo 12.

The correction of the horizontal range and height signals for earth curvature mentioned above is accomplished in the following manner. Height computer 6 receives an earth curvature correction signal from horizontal range computer 8 and combines the correction with the corrected height signal received from elevation computer 2 to produce an earth curvature correction signal for horizontal range which is fed into elevation computer 2. Azimuth rate computer 7 receives azimuth angle signal B from radar 1 and generates a signal proportional to the rate of change of azimuth indicated as $\dot{B}$ which is fed to horizontal range computer 8. The horizontal range feedback signal $R_f$ obtained from elevation computer 2 is combined with correction signals in horizontal range computer 8 to produce the earth curvature correction signals sent to elevation computer 2 and height computer 6. Horizontal range computer 8 also combines the azimuth rate signal $\dot{B}$ and horizontal range signal $R_h$ to produce an aircraft speed signal $R_h\dot{B}$ which is the component of aircraft speed perpendicular to the azimuth line. Horizontal range computer 8 feeds the aircraft speed signal $R_h\dot{B}$ along with the horizontal range signal $R_h$ to ground course computer 9 which combines the aircraft's speed signal $R_h\dot{B}$ and horizontal range signal $R_h$ with the azimuth signal B received from azimuth computer 3 to produce a mechanical signal proportional to the ground course of the aircraft indicated as CUS.

Synch mark computer 10 accepts the east-west displacement signal from X computer 4 and the north-south displacement signal from Y computer 5 together with the ground course signal from ground course computer 9 to produce displacements for X pen drive servo 11 and Y pen drive servo 12 which provides a continuous tracing mark on plotting surface 13 indicative of the aircraft's position. Synch mark computer 10, responsive to manually or clock controlled switches, produces a time and direction mark on the plotting board which is always at a predetermined angular relationship with the continuous map trace.

In FIG. 2 a schematic diagram of an operable embodiment of the control system of FIG. 1 is shown. Elevation servo 20 in elevation computer 2 is driven by an electrical input data from radar 1 which is proportional to elevation angle E. Rotor windings 15 and 16 of resolver 14 are geared to servo motor 20. Stator winding 21 of resolver 14 receives an electrical input from radar 1 proportional to the slant range $R_s$. The voltage induced in rotor winding 16 is equal to the slant range times the sine of the elevation angle and is equivalent to the uncorrected height $H_u$ of the aircraft. The output of winding 15 represents the slant range times the cosine of the elevation angle and is equivalent to the uncorrected horizontal range $R_u$ of the aircraft. In essence, elevation computer 2 solves the equations $H_u = R_s$ sine $E$ and $R_u = R_s$ cos $E$.

In horizontal range computer 8 voltage source 17 supplies an alternating-current voltage to potentiometer 18 through terminal X which is used to compute the necessary correction, for both horizontal range and height, due to the curvature of the earth. The voltage output from source 17 represents a constant K proportional to the earth's curvature. Movable arm 32 of potentiometer 18 is mechanically driven by rotor 31 of alternating-current tachometer generator 65 (described hereinafter), which provides a mechanical signal proportional to the horizontal range feedback signal $R_f$. The voltage present between arm 32 and ground is the product of the constant K and the horizontal range feedback signal $R_f$. This voltage is then applied through trimmer resistor 36 whose movable arm is connected to potentiometer 19 of height computer 6. Resistor 36 produces the constant $K_r$ which is the earth curvature correction constant for range. Movable arm 37 of potentiometer 19 is electrically connected to one end of rotor winding 15 of resolver 14 and is mechanically driven by height servo 22 driven by rotor winding 16 of elevation computer 2. The voltage presented to winding 15 by arm 37 is equal to the product $K_rR_fH$ and is the correction signal to be applied to the uncorrected horizontal range $R_u$ computed by resolver 14 at rotor winding 15. The voltage from movable arm 37 is fed in series with winding 15 in such a direction as to make the corrected range shorter than the horizontal range computed by the elevation resolver. Thus the voltage output of winding 15 is equal to $R_u - K_rR_hH$ which is the corrected horizontal range $R_h$. The height must also be corrected for curvature of the earth. The voltage present between movable arm 32 and ground is applied through trimmer resistor 33 across potentiometer 34 which has one end connected to movable arm 35 of trimmer resistor 33 and the other end connected to ground. Trimmer resistor 33 produces the constant $K_h$ which is the earth curvature correction for height. Movable arm 38 of potentiometer 34 is driven by rotor 31 of tachometer generator 65 and multiplies the voltage $K_hR_f$ by $R_h$ to produce a result $K_hR_f^2$ at arm 38 which is fed into rotor winding 16. The voltage from movable arm 38 is fed in series with winding 16 in such a direction as to make the corrected height larger than the height computed by the elevation resolver. Thus the voltage output of the other end of winding 16 is equal to $H_u + K_hR_f^2$ or the corrected height H. The corrected height H signal is fed from winding 16 to height servo 22.

The voltage output from winding 15 which is equal to $R_h$, the corrected horizontal range, is connected to stator winding 39 of resolver 24 in azimuth computer 3. Azimuth servo 23 is driven by an electrical signal input data from radar 1 which is proportional to the azimuth angle B. Rotor windings 40 and 41 of resolver 24 are geared to servo 23. The voltage induced in rotor winding 40 is equal to the horizontal range times the sine of the azimuth angle and is proportional to the X coordinate of the aircraft's position. Rotor winding 40 is connected across potentiometer 25 of X computer 4. Movable arm 42 which may be manually adjusted on potentiometer 25 in accordance with the map scale desired on plotting surface 13 is connected to X position servo amplifier 27. Servo amplifier 27 is connected to X pen drive servo motor 11. Servo motor 11 is mechanically connected to drive pen beam 47 along the X axis of plotting surface 13. Rotor winding 41 is connected across resistor 26 of Y computer 5. Movable arm 50 which may be manually adjusted on resistor 26 in accordance with the map scale desired is connected to Y position servo amplifier 28. Servo amplifier 28 is connected to Y pen drive servo 12. Servo 12 is connected to drive pen beam 54 along the Y axis of plotting surface 13.

In azimuth rate computer 7 azimuth rate position servo 29 is connected to receive an electrical signal input data from radar 1 which is proportional to the azimuth angle B. Alternating-current tachometer generator 30, which is a two phase induction generator, has its rotor 55 mechanically coupled to motor 29. Excitation field winding 56 receives an excitation from alternating-current source 57 through terminals A and B. Alternating-current source 57 is 90 degrees out of phase with alternating-current source 17. Generator 30 generates an alternating-current signal at control field winding 58 which is proportional to the rate of change of azimuth of the aircraft. The output from winding 58 is connected to trimmer resistor 59 of horizontal range computer 8. Adjustable arm 60 of potentiometer 59 is connected through resistor 61 to ground. Movable arm 62 of potentiometer 61 is connected to be mechanically driven by rotor 31 of tachometer generator 65. The voltage between arm 62 and ground is the product of the azimuth rate signal and the horizontal range signal ($R_h \dot{B}$). This voltage is fed to stator winding 64 of resolver 63 in ground course computer 9. Tachometer generator 65 in horizontal range computer 8 has its rotor 31 mechanically coupled to motor 66 which is electrically connected to the output of winding 15 of resolver 14 in elevation computer 2. Servo 66 rotates rotor 31 in proportion to the horizontal range $R_h$. Alternating-current source 57 supplies the field excitation to winding 67 of generator 65 through terminals A and B. Control field winding 68 of generator 65 produces a signal proportional to the horizontal range rate $\dot{R}_h$ and is connected to stator winding 69 of resolver 63. Resolver 63 combines the $\dot{R}_h$ signal received at stator winding 69 and the $R_h \dot{B}$ signal received at stator winding 64 and produces a resultant mechanical position signal at its rotor which is proportional to the angle whose tangent is equal to the $R_h \dot{B}$ signal divided by the $\dot{R}_h$ signal. The rotor of resolver 63 is mechanically coupled to mechanical differential 72. Rotor windings 78 and 79 of resolver 63 are supplied by alternating-current sources 57 and 17 respectively. Mechanical differential 72 also receives a mechanical signal proportional to azimuth angle B from azimuth computer 3. The mechanical output of mechanical differential 72, which is proportional to ground course, positions the rotor resolver 44 in synch mark computer 10. Rotor winding 73 of resolver 44 is connected to alternating-current source 17 through switch 74 and rotor winding 75 is connected to alternating-current source 17, through switch 76. Stator winding 43 is connected in parallel with potentiometer 44. A part of the resistance of potentiometer 44 and its movable arm 77 are connected in series with X position servo amplifier 27 and X pen drive servo 11. Stator winding 51 is connected in parallel with potentiometer 52. A portion of the resistance of potentiometer 52 and its movable arm 78 are connected in series between Y position servo amplifier 28 and Y pen drive servo 12.

In operation, the slant range, $R_s$ the azimuth angle, B, and the elevation angle E are continuously provided by radar 1. The electrical signal from radar 1 proportional to elevation angle E is converted by servo motor 20 to a mechanical signal which drives the rotor of resolver 14. The electrical signal from radar 1 proportional to slant range $R_s$ is fed into stator winding 21. Resolver 14 solves the equations $H_u = R_s \sin E$ and $R_u = R_s \cos E$ presenting the quantity $H_u$, the uncorrected height, at winding 16 and presenting the quantity $R_u$, the uncorrected horizontal range, at winding 15. In horizontal range computer 8, alternating-current source 17 provides the constant K to potentiometer 18, which has its movable arm 32 driven by rotor 31 with the mechanical signal $R_f$. Movable arm 32 provides a voltage proportional to $KR_f$ to trimmer resistor 36 which converts K into $K_r$ and presents $K_r R_f$ to resistor 19 in height computer 6. Movable arm 37, mechanically driven by height servo 22 with a signal proportional to H provides a correction voltage for horizontal range to winding 15 which is $K_r R_f H$. Winding 15 combines the correction $K_r R_f H$ with $R_u$ to produce $R_h$, the corrected horizontal range, and feeds the $R_h$ signal to stator winding 39 of resolver 24 in azimuth computer 3. The constant K signal produced by resistor 18 is also applied through trimmer resistor 33, which produces the constant $K_r$ across potentiometer 34 which has its movable arm 35 connected to resistor 34. Movable arm 38 of potentiometer 34 is mechanically driven by rotor 31 with an $R_f$ signal and the signal produced by movable arm 38, equal to $K_h R_f^2$ is fed to rotor winding 16. Winding 16 combines the correction $K_h R_f^2$ with $H_u$ to produce H, the corrected height, which drives height servo 22. Resolver 24 of azimuth computer 3 combines the $R_h$ signal at stator winding 39 with the azimuth signal B received from azimuth servo 23 and fed mechanically into the rotor of resolver 24. The output of rotor winding 40 is equal to $R_h \sin B$ and is the X coordinate of the aircraft's position. X position servo amplifier 27 receives the X coordinate signal from winding 40 through resistor 25 and feeds the signal to X pen drive servo 11 which drives pen beam 47 along the X axis of plotting surface 13. Resistor 77 in series with servo 27 and servo 11 does not affect the X coordinate signal in the absence of a signal from switches 74 and 76.

The output of rotor winding 41 is equal to $R_h \cos B$ and is the Y coordinate of the aircraft's position. Y position servo amplifier 28 receives the Y coordinate signal from winding 41 through resistor 26 and feeds the signal to Y pen drive servo 12 which drives pen beam 54 along the Y axis of plotting surface 13. Resistor 52 in series with servo 28 and servo 12 does not affect the Y coordinate signal in the absence of a signal from switches 74 and 76. A continuous indication of the aircraft's position is now being plotted on plotting surface 13.

In order to provide a synchronizing mark to give an indication of time and direction synch mark computer 10, which up to now has not affected the operation, is utilized. Azimuth rate computer 7 converts the azimuth angle B received from radar 1 into the azimuth rate signal $\dot{B}$ in alternating-current tachometer generator 30. Winding 58 feeds the $\dot{B}$ signal to resistor 59 of horizontal range computer 8. Resistor 59 presents the $\dot{B}$ signal to potentiometer 61 which has its movable arm 62 driven by an $R_h$ signal from the rotor 31. The $R_h \dot{B}$ product produced by arm 62 is fed to stator winding 64 of resolver 63 in ground course computer 9. Stator winding 69 received a signal from stator winding 68 of tachometer generator 65 which is equal to $\dot{R}_h$, the horizontal range rate. Resolver 63 combines $R_h \dot{B}$ and $\dot{R}_h$ to produce a mechanical position signal at the rotor of resolver 63 which is equal to $$\frac{R_h \dot{B}}{\dot{R}}$$

This signal is mechanically coupled to mechanical differential 72 which combines it with the mechanical signal B from azimuth computer 3 to produce a mechanical signal proportional to the ground course of the aircraft which positions the rotor of synch mark computer 10. Upon the closing of switch 76 a voltage is induced by alternating-current source 17 into rotor winding 75. The rotor of resolver 44 is originally positioned at a predetermined angular position relative to windings 43 and 51. The voltage in winding 75 is resolved into two voltages, at stator windings 43 and 51 respectively proportional to the sine and cosine of the angle between the rotor and each stator coil. The voltages at stator windings 43 and 51 as related to the course signal by a predetermined constant angle. These voltages add to the signals from servos 27 and 28 to cause pen drive motors 11 and 12 to move pen beams 47 and 54 in a direction which is directly proportional to the predetermined angular displacement between the rotor of resolver 44 and stator windings 43 and 51. Similarly, the closing of switch 74 in synch mark computer 10 causes a voltage in rotor winding 73 which is resolved into voltages at stator windings 43 and 51. These voltages add to the signals from servos 27 and 28 causing pen drive servos 11 and 12 to move pen beams 47 and 54 in a direction proportional to the predetermined angular displacement in resolver 44 plus the angle between coils 73 and 75. Upon opening switches 76 and 74 the map trace resumes its recording of the aircraft's position.

Since windings 73 and 75 of resolver 44 are displaced from each other by 90 degrees, the mark produced by closing switch 74 is 90 degrees displaced from the mark produced by closing switch 76. Thus by selectively energizing switches 74 and 76 a direction mark in the form of an arrow is formed. It is noted that windings 73 and 75 are shown at 90 degrees displacement for example only and may be adjusted to any angular displacement desired. Two or more separate traces may be shown on plotting surface 13 and easily identified by using a separate and distinct angular displacement between windings 73 and 75 for each map trace. In addition by varying the time of closure of switches 76 and 74 the amplitude of the marking signal may be varied to provide any desired length of the mark on the plotting surface.

Turning now to FIG. 3, there is shown a typical map trace of a moving target including the marking components. A continuous indication of the target's position is denoted by line 80. When the target, or aircraft, reaches point A on line 80, switch 76 is closed inducing a voltage in winding 73 which is resolved into X and Y signals by windings 43 and 51, respectively. The voltages in resistors 77 and 52 act to move the tracing pen from point A to B. When switch 76 is opened the pen trace moves back to line 80 from point B to C. Similarly, when switch 74 is closed the trace will move from point D to E and back to F upon opening of the switch. Due to the 90 degree displacement between windings 73 and 75 and initial 45° displacement between the rotor and stator of resolver 44 the mark produced by ABC makes a 45 degree angle to the right with line 80 and the mark produced by DEF makes a 45 degree angle to the left with line 80. Thus, in effect, by selectively energizing switches 74 and 76, an arrow is created which gives a clear indication of travel of the aircraft. The mark produced on plotting surface 13, in addition to giving the direction of the aircraft, can also be used as a synchronizing mark. Thus, point A indicates the precise spot the aircraft is at the time switch 76 is closed. By utilizing a timing device as a clock generator to actuate switches 74 and 76, an arrow type indication on the trace may be shown. One switch only can be used to produce a constant angular displaced marking signal which will give a continuous indication of the direction of the map trace, as the switch is repetitively actuated.

The invention described and illustrated provides for a direction indicating mark on a position indicating display device for aircraft. It is to be noted that other moving targets such as ships, land vehicles, etc. could likewise be tracked with the device of this invention.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A position indicating system comprising a display device having a display area and means for producing a visible mark thereon, control means for moving said mark in each of a pair of mutually orthogonal coordinate directions on said area, means for generating a pair of position signals respectively indicative of a pair of spatial rectangular coordinates of a moving object, means for feeding said signals to said control means to cause said mark to trace the course of said object, course means for generating a course signal indicative of the angular relation of said course to a reference direction, means responsive to said course means for generating a mark indicating the direction of travel along a course, said means for generating being responsive to changes in course so as to provide a mark having a constant angle relative to said course 2. In a position indicator having a display device for continuously indicating the position of a target in a predetermined plane, detecting means for deriving a pair of signals respectively indicative of two mutually rectangular coordinates of the position of said target in said predetermined plane, plotting means for producing a continuous indication on said display device of the position of said target in said predetermined plane, first and second control means responsive to said detecting means for driving said plotting means, and marking means responsive to said detecting means for adding to each of said first and second control means a pair of direction marking components to modify said continuous indication to produce a pair of marks on said display device which are each at a predetermined angular displacement from said continuous indication and at a predetermined angular displacement from each other to indicate the direction of said target.

3. The combination recited in claim 2 wherein said marking means comprise a resolver having at least two angularly related rotor coils responsive to said detecting means, means for selectively connecting to each of said rotor coils a source of electrical signal of predetermined magnitude to produce said pair of marking signals, and means for coupling the output of each of said rotor coils to said first and second control means.

4. In a position indicator having a display device for continuously indicating the position of an aircraft in a predetermined plane, detecting means for deriving a pair of signals respectively indicative of two mutually rectangular coordinates of the position of said aircraft in said predetermined plane, plotting means for producing a continuous indication on said display device of the position of said aircraft in said predetermined plane, first and second control means responsive to said detecting means for driving said plotting means, a resolver having a pair of rotor coils in predetermined angular relation, an alternating-current source, switching means for selectively coupling said alternating-current source to each of said rotor coils to induce a marking voltage therein, and means having a predetermined angular relation with respect to said rotor coils for coupling the output of each of said rotor coils to said first and second control means to produce a pair of marking signals having an angular relation to each other corresponding to said predetermined angular relation between said coupling means and said rotor coils.

5. The combination recited in claim 4 in which said switching means comprise a first switch in series with said alternating-current source and one of said rotor coils, and a second switch in series with said alternating-current source and the other of said rotor coils whereby the closing of said first switch induces a marking voltage corresponding to one of said marking signals.

6. A plan position indicator system for continuously indicating the position of an aircraft in a horizontal plane comprising means responsive to voltages proportional to the range, azimuth and elevation of an aircraft relative to a ranging device for generating voltages proportional to the height, azimuth and horizontal distance of said aircraft, means responsive to said height, azimuth and horizontal voltages for generating voltages proportional to the rectangular coordinates of said horizontal distance, direction marking means for adding a pair of marking voltages having a constant predetermined angular relation to said rectangular coordinate voltages, and an indicating device responsive to said rectangular coordinate voltages and said marking voltage to indicate the position and direction of said aircraft.

7. The combination recited in claim 6 wherein said direction marking means comprises a resolver having at least two rotor coils angularly related to each other and two stator coils responsive therto, an alternating-current source connected to provide alternating current to said rotor coils, switching means connecting said alternating-current source to said rotor coils to induce a marking voltage therein, said stator coils being connected in series between said indicating device and said rectangular coordinate voltage generating means.

References Cited in the file of this patent
UNITED STATES PATENTS

| | | |
|---|---|---|
| 2,701,352 | Kingdon | Feb. 1, 1955 |
| 2,715,335 | Hartman | Aug. 16, 1955 |
| 2,749,205 | Schmitt | June 5, 1956 |
| 2,776,099 | Ferrill | Jan. 1, 1957 |